United States Patent
Tanaka et al.

(10) Patent No.: US 12,037,665 B2
(45) Date of Patent: Jul. 16, 2024

(54) SPOT WELDED MEMBER

(71) Applicant: JFE Steel Corporation, Tokyo (JP)

(72) Inventors: Minoru Tanaka, Tokyo (JP); Koichi Taniguchi, Tokyo (JP); Rinta Sato, Tokyo (JP); Katsutoshi Takashima, Tokyo (JP); Hiroshi Matsuda, Tokyo (JP); Rinsei Ikeda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 583 days.

(21) Appl. No.: 17/414,111

(22) PCT Filed: Dec. 19, 2019

(86) PCT No.: PCT/JP2019/049846
§ 371 (c)(1),
(2) Date: Jun. 15, 2021

(87) PCT Pub. No.: WO2020/130079
PCT Pub. Date: Jun. 25, 2020

(65) Prior Publication Data
US 2022/0049330 A1 Feb. 17, 2022

(30) Foreign Application Priority Data
Dec. 21, 2018 (JP) .................................. 2018-239565

(51) Int. Cl.
*C22C 38/02* (2006.01)
*B23K 11/00* (2006.01)
(Continued)

(52) U.S. Cl.
CPC .......... *C22C 38/02* (2013.01); *B23K 11/0026* (2013.01); *B23K 11/115* (2013.01);
(Continued)

(58) Field of Classification Search
CPC . B23K 11/0026; B23K 11/115; B23K 11/166; B23K 2101/006; B23K 2101/18;
(Continued)

(56) References Cited

U.S. PATENT DOCUMENTS

| 10,350,701 B2 | 7/2019 | Miyazaki et al. |
| 10,946,470 B2 | 3/2021 | Saswanishi et al. |
| 2017/0240999 A1* | 8/2017 | Suzuki .................... C22C 38/04 |

FOREIGN PATENT DOCUMENTS

| CN | 103492605 A | 1/2014 |
| CN | 207629383 U | 7/2018 |

(Continued)

OTHER PUBLICATIONS

Bhattacharya, "Liquid Metal Embrittlement During Resistance Spot Welding of Zn-Coated High-Strength Steels", Materials Science and Technology, 2018, vol. 34, No. 15, pp. 1809-1829.
(Continued)

*Primary Examiner* — Dana Ross
*Assistant Examiner* — Joseph W Iskra
(74) *Attorney, Agent, or Firm* — Buchanan Ingersoll & Rooney PC

(57) ABSTRACT

A spot welded member includes a spot weld formed by holding a sheet stack of multiple steel sheets between a pair of electrodes and spot-welding the sheet stack, in which at least one of the multiple steel sheets is a high-strength zinc-based coated steel sheet having a tensile strength of 780 MPa or more, the high-strength zinc-based coated steel sheet having a coating with an Al content of 0.5% or more by mass, and in which the heat shock region of the spot weld outwardly extending from an edge of a corona bond area includes a coated layer including an FeAl alloy layer having an average thickness of 0.3 μm or more and a zinc-based coated layer having an average thickness of 2.0 μm or more (Continued)

on the FeAl alloy layer at the interface between the base steel sheet of the high-strength zinc-based coated steel sheet and the coating.

20 Claims, 2 Drawing Sheets

(51) Int. Cl.
*B23K 11/11* (2006.01)
*B23K 11/16* (2006.01)
*B23K 101/18* (2006.01)
*B23K 101/34* (2006.01)
*B23K 103/04* (2006.01)
*C22C 18/04* (2006.01)
*C22C 38/04* (2006.01)
*C23C 2/06* (2006.01)
*C23C 2/28* (2006.01)
*C23C 2/40* (2006.01)

(52) U.S. Cl.
CPC ............ *B23K 11/166* (2013.01); *C22C 18/04* (2013.01); *C22C 38/04* (2013.01); *C23C 2/06* (2013.01); *C23C 2/28* (2013.01); *C23C 2/40* (2013.01); *B23K 2101/18* (2018.08); *B23K 2101/34* (2018.08); *B23K 2103/04* (2018.08)

(58) Field of Classification Search
CPC ............ B23K 2101/34; B23K 2103/04; B32B 15/013; C22C 18/04; C22C 38/002; C22C 38/02; C22C 38/04; C22C 38/12; C22C 38/14; C23C 2/06; C23C 2/28; C23C 2/40; C23C 30/00
USPC ....................................................... 219/78.01
See application file for complete search history.

(56) References Cited

FOREIGN PATENT DOCUMENTS

| | | | |
|---|---|---|---|
| EP | 2695963 | A1 | 2/2014 |
| EP | 3663424 | A1 | 6/2020 |
| JP | 6108049 | B2 | 4/2017 |
| JP | 6281671 | B1 | 2/2018 |
| JP | 2018039019 | A | 3/2018 |
| WO | 2017104647 | A1 | 6/2017 |

OTHER PUBLICATIONS

Extended European Search Report for European Application No. 19899644.9, dated Dec. 17, 2021, 10 pages.
International Search Report and Written Opinion for International Application No. PCT/JP2019/049846, dated Mar. 17, 2020, 5 pages.
Chinese Office Action for Chinese Application No. 201980084400. 6, dated Mar. 23, 2022 with Concise Statement of Relevance of Office Action, 7 pages.
Takashima, K. et al., "Development of Resistance Spot Welding Technology to Suppress LME Crack in Ultra High Strength Steel Sheets (1st report)—Factorial Analysis of LME Crack at Spot Welding Parts," 2017, 4 pages, Lecture Summary Collections in National Conventions in Japan Welding Society, the 100th series (with English translation).
Samwanishi, C. et al., "Development of Resistance Spot Welding Technology to Suppress LME Crack in Ultra High Strength Steel Sheets (2nd report)—Generation Mechanism of LME Crack at Spot Welding Parts," 2017, 4 pages, Lecture Summary Collections in National Conventions in Japan Welding Society, the 100th series (with English translation).
Taniguchi, K. et al., "Development of Resistance Spot Welding Technology to Suppress LME Crack in Ultra High Strength Steel Sheets (3rd report)—Suppression Technology of LME Crack at Spot Welding Parts," 2017, 4 pages, Lecture Summary Collections in National Conventions in Japan Welding Society, the 100th series (with English translation).

* cited by examiner

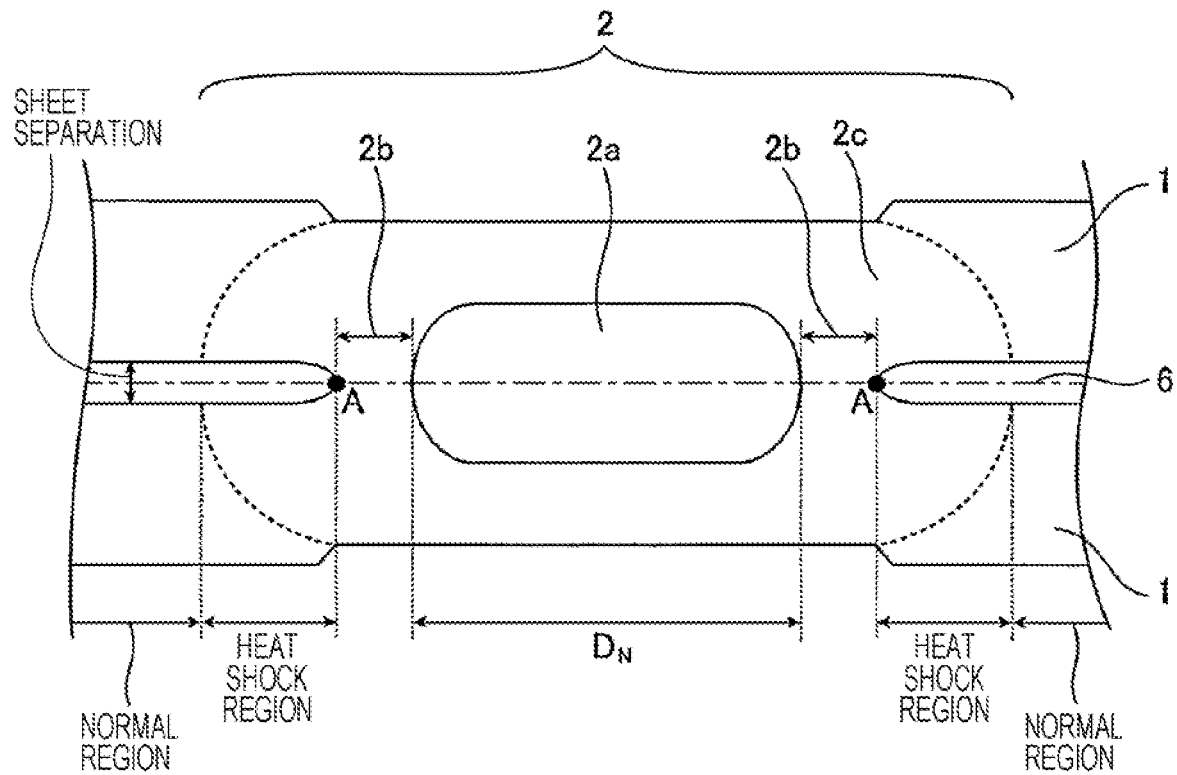
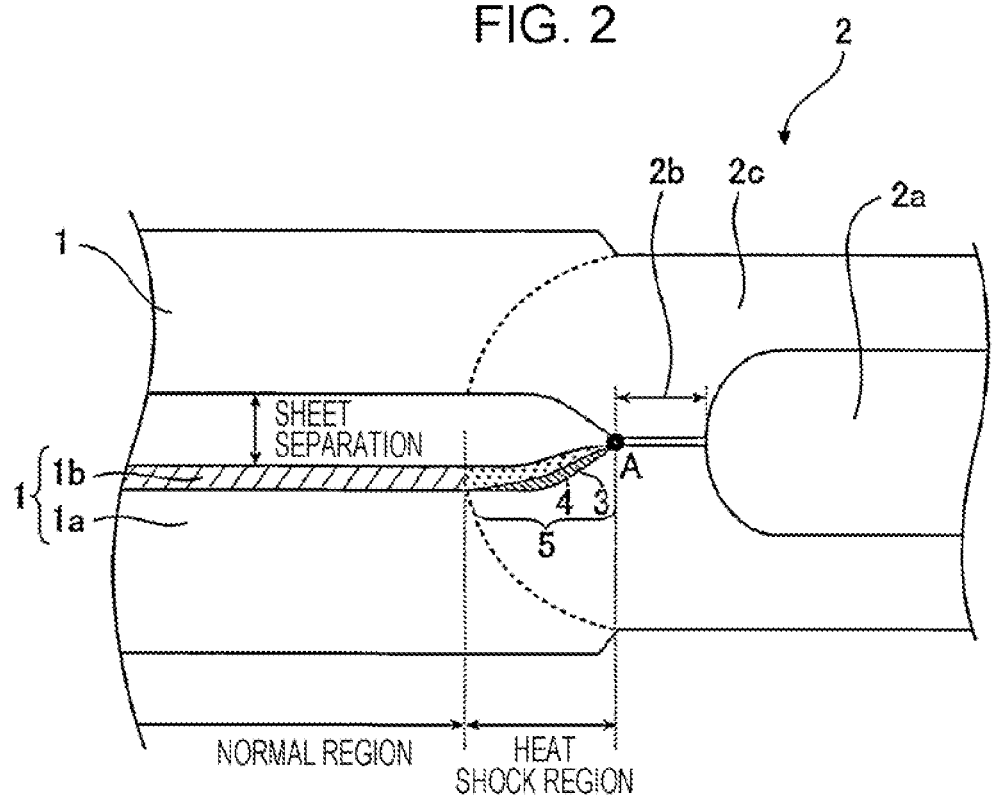

SPOT WELDED MEMBER

CROSS REFERENCE TO RELATED APPLICATIONS

This is the U.S. National Phase application of PCT/JP2019/049846, filed Dec. 19, 2019, which claims priority to Japanese Patent Application No. 2018-239565, filed Dec. 21, 2018, the disclosures of these applications being incorporated herein by reference in their entireties for all purposes.

FIELD OF THE INVENTION

The present invention relates to a spot welded member having a spot weld produced by resistance spot welding (hereinafter, also referred to as "spot welding") of multiple steel sheets including a zinc-based coated steel sheet, and relates to a spot welded member mainly used for automotive steel sheets.

BACKGROUND OF THE INVENTION

Surface-treated steel sheets having rust prevention are used as steel sheet materials in fields, such as automobiles, household electrical appliances, and construction materials. Among these, hot-dip galvanized steel sheets and hot-dip galvannealed steel sheets, which are excellent in rust prevention, are used.

A hot-dip zinc coated steel sheet is typically produced by the following method: A slab is subjected to hot rolling and cold rolling. Alternatively, a slab is subjected to hot rolling, cold rolling, and heat treatment. The resulting steel sheet is used as a base steel sheet. The base steel sheet is cleaned by degreasing and/or pickling surfaces of the steel sheet in a pretreatment step. Alternatively, the pretreatment step is omitted, and oil on the surfaces of the steel sheet is removed by burning in a preheating furnace. Then the base steel sheet is subjected to recrystallization annealing by heating in a non-oxidizing atmosphere or a reducing atmosphere. Subsequently, the steel sheet is cooled to a temperature appropriate for coating in the non-oxidizing atmosphere or the reducing atmosphere and immersed in a molten zinc bath without exposure to air. Thereby, the surfaces of the steel sheet are coated with zinc to produce a hot-dip galvanized steel sheet. A hot-dip galvannealed steel sheet is produced by, after the hot-dip galvanization, heat-treating the steel sheet in a galvannealing furnace. Examples of a technique for forming a zinc-based coating on surfaces of steel sheet include hot-dip galvanizing processes, and film-forming techniques by electrogalvanizing and physical vapor deposition (PVD) methods.

In the automotive field, higher performance and weight reduction of steel sheet materials have recently been promoted. As steel sheet materials, the use of high-strength hot-dip galvanized steel sheets, electrogalvanized steel sheets, and high-strength hot-dip galvannealed steel sheets, which have rust prevention, is increasing. When these zinc-coated steel sheets are used as steel sheet materials, these steel sheets have the following problems.

Typically, spot welding is mainly used in the assembly of automobile bodies and the installation of components. However, in the spot welding of a sheet stack including a zinc-based coated steel sheet, cracking may disadvantageously occur in a weld. This is considered to be due to what is called liquid metal embrittlement in which a low-melting-point metal coated layer on surfaces of a steel sheet changes into a liquid phase during the welding process and enters grain boundaries of the steel sheet to decrease grain boundary strength and cause cracking. This cracking during the spot welding is known to occur on a surface where an electrode and the steel sheet are in contact with each other or surfaces where the steel sheets are in contact with each other.

For example, Non Patent Literatures 1 and 2 report a phenomenon in which in the case where, during the resistance spot welding of high-strength steel sheets including a zinc-coated steel sheet, a zinc coating is present on a faying surface of the stacked steel sheets and where electrodes are inclined, cracking occurs between the steel sheets (that is, cracking at the faying surface where the steel sheets are in contact with each other). Non Patent Literature 3 reports that the cracking between steel sheets is suppressed by increasing a hold time during welding.

For example, Patent Literature 1 discloses, in the spot welding of steel sheets including a high-strength zinc-based coated steel sheet, a technique for suppressing the occurrence of cracking in a weld by removing the coated layer near the weld before the spot welding.

PATENT LITERATURE

PTL 1: Japanese Patent Application No. 2016-562041

NON PATENT LITERATURE

NPL 1: Takashima et al., "Development of resistance spot welding technology to suppress LME crack in ultrahigh strength steel sheets (1st report)", Preprints of the National Meeting of Japan Welding Society, Heisei 29 (2017) Spring National Meeting, P16(2017)

NPL 2: Sawanishi et al., "Development of resistance spot welding technology to suppress LME crack in ultrahigh strength steel sheets (2nd report)", Preprints of the National Meeting of Japan Welding Society, Heisei 29 (2017) Spring National Meeting, P18(2017)

NPL 3: Taniguchi et al., "Development of resistance spot welding technology to suppress LME crack in ultrahigh strength steel sheets (3rd report)", Preprints of the National Meeting of Japan Welding Society, Heisei 29 (2017) Spring National Meeting, P20(2017)

SUMMARY OF THE INVENTION

However, in the technique described in Non Patent Literature 3, the hold time needs to be increased to prevent cracking in spot welds, thereby decreasing the productivity of a welded member.

In the technique described in Patent Literature 1, a step of partially removing the coated layer is required after coating formation in order to prevent cracking in the spot welds, thus leading to an increase in cost. Although the technique described in Patent Literature 1 can inhibit the occurrence of cracking in spot welds, a new problem arises in which removal of the coated layer deteriorates the corrosion resistance of the welds.

Aspects of the present invention have been accomplished in view of the foregoing circumstances and aims to provide a spot welded member in which the occurrence of cracking is suppressed in spot welds and which has high corrosion resistance even when multiple steel sheets including a zinc-based coated steel sheet are spot-welded.

The inventors have focused their attention on the fact that cracking may or may not occur in spot welds even when multiple steel sheets including a zinc-based coated steel sheet are spot-welded and have conducted intensive studies on a welded member that solves the foregoing problems.

Specifically, high-strength zinc-based coated steel sheets having various zinc-based coated layers were spot-welded. The cross-sectional structures of the resulting spot welds were examined for cracks. Additionally, the corrosion resistance of the spot welds was evaluated by means of a corrosion resistance test. The results revealed that even in the case of the spot welding of steel sheets including a zinc-based coated steel sheet, a spot welded member which includes a high-strength galvanized steel sheet, in which the occurrence of cracking is suppressed, and which has high corrosion resistance is obtained by controlling a coating structure near the spot welds after the spot welding.

Aspects of the present invention have been made on the basis of the foregoing findings, and are described below.

[1] A spot welded member includes a spot weld formed by holding a sheet stack of multiple steel sheets between a pair of electrodes and spot-welding the sheet stack,
in which at least one of the multiple steel sheets is a high-strength zinc-based coated steel sheet having a tensile strength of 780 MPa or more, the high-strength zinc-based coated steel sheet having a coating with an Al content of 0.5% or more by mass, and
in which a heat shock region of the spot weld outwardly extending from an edge of a corona bond area includes a coated layer including an FeAl alloy layer having an average thickness of 0.3 μm or more and a zinc-based coated layer having an average thickness of 2.0 μm or more on the FeAl alloy layer at the interface between a base steel sheet of the high-strength zinc-based coated steel sheet and the coating.

[2] In the spot welded member described in [1], the Al content of the coating satisfies formula (1):

[Average thickness of FeAl alloy layer]≥0.8×ln[Al content]+0.2    (1)

where ln is a natural logarithm, [average thickness of FeAl alloy layer] is the average thickness (μm) of the FeAl alloy layer, and [Al content] is the Al content (% by mass).

[3] In the spot welded member described in [1] or [2], the coated layer further includes a Zn-rich phase (η) having an Fe content of 5% or less by mass.

[4] In the spot welded member described in any one of [1] to [3], the Zn-rich phase (η) has (001) orientation with respect to a basal surface.

[5] In the spot welded member described in any one of [1] to [4], the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

[6] In the spot welded member described in [5], the component composition of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

The term "high-strength" used in accordance with aspects of the present invention refers to a steel sheet having a tensile strength of 780 MPa or more. The term "zinc-based coated steel sheet" used in accordance with aspects of the present invention is a generic term used to refer to a steel sheet coated with a zinc-based coating by any of various production methods, such as hot-dip coating methods, electroplating methods, evaporation coating methods, and flame spraying methods. Additionally, the zinc-based coated steel sheet includes both a hot-dip galvanized steel sheet (GI), which has not been subjected to alloying treatment, and a hot-dip galvannealed steel sheet (GA), which has been subjected to alloying treatment. Non-limiting examples of zinc-based coating include hot-dip galvanized coating, hot-dip galvannealed coating, hot-dip zinc-aluminum alloy coating, hot-dip zinc-aluminum-magnesium alloy coating, electrogalvanized coating, and electrolytic zinc-nickel alloy coating. All known zinc-based coatings containing zinc can be used.

According to aspects of the present invention, even in the case of spot welding of the sheet stack of multiple steel sheets that includes at least one zinc-based coated steel sheet, the spot welded member in which the occurrence of cracking is suppressed in spot welds and which has high corrosion resistance is provided.

BRIEF DESCRIPTION OF THE DRAWINGS

FIG. 1 is a cross-sectional view illustrating the structures of a spot weld and faying surfaces of steel sheets around the spot weld of a spot welded member according to an embodiment of the present invention.

FIG. 2 is a cross-sectional view illustrating a spot weld of a spot welded member according to an embodiment of the present invention.

DETAILED DESCRIPTION OF EMBODIMENTS OF THE INVENTION

Figure 3:
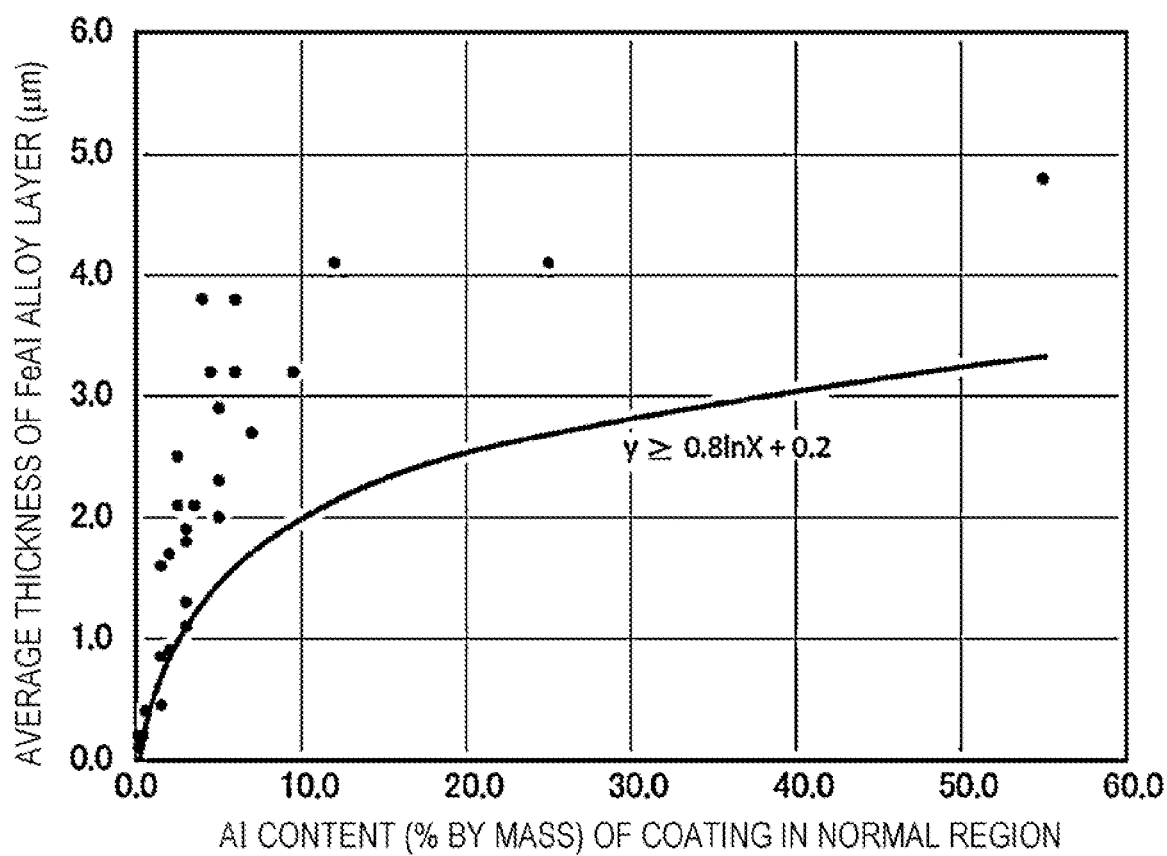
FIG. 3 is a graph illustrating the relationship between the Al content (% by mass) of a coating at an edge of a corona bond area and the thickness (μm) of an FeAl alloy layer.

A spot welded member according to aspects of the present invention will be described below. The present invention is not limited to these embodiments. In the following description, the amounts of elements contained in the component composition of a high-strength, hot-dip zinc-based coated steel sheet and the amounts of elements contained in the component composition of a coated layer are given in units of "% by mass" and expressed simply as "%", unless otherwise specified.

The structure of a coated layer 5 of a spot weld 2 after spot welding, which is the most important part in accordance with aspects of the present invention, will be described below. FIGS. 1 and 2 are cross-sectional views illustrating the structures of the spot weld 2 and faying surfaces of steel sheets around the spot weld 2 of a spot welded member according to an embodiment of the present invention and schematically illustrate sections each including a weld in the thickness direction of the steel sheets. Each figure illustrates an example of a spot welded member formed by spot-welding a sheet stack of two steel sheets. In FIG. 1, the coating of each steel sheet 1 is not illustrated. FIG. 2 is an enlarged view of one side (left side of FIG. 1) of the section of the spot weld in FIG. 1.

Here, the section of the spot weld 2 in the spot welded member according to aspects of the present invention is defined as follows: When a plane 6 between the stacked steel sheets 1 (steel sheet stacking plane) is indicated by a dash-dotted line as illustrated in FIG. 1, a point at which the steel sheet stacking plane 6 and an edge of a corona bond area 2b adjacent to a weld heat-affected zone (HAZ) 2c overlap one another is defined as point A. In the following description, point A is referred to as an "edge A of a corona bond area". In accordance with aspects of the present invention, a region of the weld heat-affected zone 2c outwardly extending from the edge A of the corona bond area (direction away from a nugget 2a) is defined as a heat shock region. A base material portion that is outside the heat shock region and that is not affected by heat input during welding is defined as a normal region. The gap between the steel sheets 1 facing each other with respect to the steel sheet stacking plane 6 is referred to as "sheet separation".

The spot welded member according to aspects of the present invention includes the spot weld 2 (hereinafter, referred to as a "weld") formed by spot welding in which a sheet stack of the multiple steel sheets 1 is held between a pair of electrodes, pressed, and energized. At least one of the multiple steel sheets 1 is a high-strength zinc-based coated steel sheet described below.

In the cross section of the weld 2 of the spot welded member according to aspects of the present invention, the coated layer 5 has a structure as illustrated in FIG. 2. Specifically, in the cross section of the weld 2, the coated layer 5 including an FeAl alloy layer 3 having an average thickness of 0.3 μm or more and a zinc-based coated layer 4 having an average thickness of 2.0 μm or more on the FeAl alloy layer 3 is provided at the interface between the base steel sheet of the high-strength zinc-based coated steel sheet 1 and the coating in a region (heat shock region) of the weld heat-affected zone 2c extending from the edge A of the corona bond area.

The Al content of the coating (i.e., the Al content of a coating 1b of the high-strength zinc-based coated steel sheet 1 in the normal region illustrated in FIG. 2) and the FeAl alloy layer 3 can satisfy the relationship represented by formula (1) below:

$$[\text{Average thickness of FeAl alloy layer}] \geq 0.8 \times \ln[\text{Al content}] + 0.2 \quad (1)$$

where ln is a natural logarithm, [average thickness of FeAl alloy layer] is the average thickness (μm) of the FeAl alloy layer, and [Al content] is the Al content (% by mass). The coated layer 5 may further include a Zn-rich phase (η) having an Fe content of 5% or less by mass.

The Zn-rich phase (η) can have (001) orientation with respect to a basal surface.

In accordance with aspects of the present invention, a region extending from the edge A of the corona bond area to a position 0.2 mm from the edge A of the corona bond area in the outward direction is observed, and the structure of the coated layer 5 in this region is specified.

As illustrated in FIG. 2, the coating 1b in the normal region (that is, the zinc-based coating 1b on a base steel sheet 1a illustrated in FIG. 2) differs from the zinc-based coated layer 4 in the heat shock region (that is, the zinc-based coated layer 4 on the FeAl alloy layer 3 illustrated in FIG. 2). A Zn coating and so forth ejected from the nugget 2a and the corona bond area 2b are present in the zinc-based coated layer 4 present in the heat shock region. The coating 1b in the normal region refers to the coating 1b on the base steel sheet 1a (high-strength zinc-based coated steel sheet 1) and is in the same state as the coating before spot welding.

Here, for the sake of explanation, the structure of the above-mentioned coated layer 5 of only the zinc-based coated steel sheet 1 (the lower steel sheet 1 in FIG. 2) is illustrated. As described below, however, the FeAl alloy layer 3 is formed on a surface of each of the steel sheets (in other words, a surface of the upper steel sheet and a surface of the lower steel sheet) disposed on both sides of the steel sheet stacking plane 6 between the zinc-based coated steel sheet and the steel sheet stacked thereon.

Al Content of Coating in High-Strength Zinc-Based Coated Steel Sheet: 0.5% or More by Mass As will be described below, one of the important requirements according to aspects of the present invention is to form a high-melting-point FeAl intermetallic compound (FeAl alloy layer 3) at the interface between the steel sheet (high-strength zinc-based coated steel sheet 1) and the coating of the steel sheet by heat input during welding. However, when the Al content of the coating of the high-strength zinc-based coated steel sheet 1 serving as a base steel sheet is less than 0.5% by mass, it is difficult to stably form a sufficient amount of the FeAl alloy layer 3. This facilitates the local penetration of Zn into the base steel sheet; thus, the effect of preventing cracking is not sufficiently provided. Accordingly, the coating 1b (that is, the coating 1b in the normal region illustrated in FIG. 2) has an Al content of 0.5% or more by mass, preferably 1.0% or more by mass, more preferably 5.0% or more by mass.

The upper limit of the Al content of the coating 1b is not particularly specified, and is preferably 10.0% or less by mass, more preferably 7.0% or less by mass from the viewpoint of improving corrosion resistance after painting.

In accordance with aspects of the present invention, the Al content of the coating 1b can be measured by a method described in an example below.

Average Thickness of FeAl Alloy Layer in Heat Shock Region: 0.3 μm or More

The inventors investigated cracking behavior around the sheet separation of the spot welds 2 of welded members produced under various conditions. The investigation results indicated that the FeAl alloy layer 3 having an average thickness of 0.3 μm or more was formed in the heat shock region (region of the weld heat-affected zone 2c outside the edge A of the corona bond area) of each welded member where no cracking occurred around the sheet separation (see FIG. 2). The reason why no cracking occurred around the sheet separation is presumably that the formation of the high-melting-point FeAl alloy layer 3 at the interface between the high-strength zinc-based coated steel sheet 1 (for example, the lower steel sheet 1 illustrated in FIG. 2) and the coating of the steel sheet inhibits the penetration of molten Zn into the steel sheet to suppress grain boundary embrittlement. Accordingly, the FeAl alloy layer 3 in the heat shock region has an average thickness of 0.3 μm or more, preferably 0.9 μm or more, more preferably 1.4 μm or more.

The upper limit of the FeAl alloy layer 3 in the heat shock region is not particularly specified and is preferably 5.0 μm or less.

Here, the FeAl alloy layer 3 refers to an intermetallic compound phase containing Fe: 30% or more by mass and Al: 30% or more by mass.

The average thickness of the FeAl alloy layer 3 refers to a value obtained by measuring the thickness of the FeAl alloy layer 3 in the thickness direction of the steel sheet in the heat shock region multiple times by a method described below and averaging the resulting measurements. In accordance with aspects of the present invention, the FeAl alloy layer can be subjected to measurements by methods described in Examples below. The above-described cracking around the sheet separation refers to cracking that occurs in the corona bond area 2b or the heat shock region in FIG. 2.

In accordance with aspects of the present invention, as described above, it is important to form the high-melting-point FeAl alloy layer 3 at the interface between the base steel sheet of the high-strength zinc-based coated steel sheet 1 and the coating of the steel sheet. The relationship between the Al content (% by mass) of the coating (the Al content of the coating 1b in the normal region) and the average thickness (μm) of the FeAl alloy layer 3 in the heat shock region will be described with reference to a graph of FIG. 3.

As illustrated in the graph of FIG. 3, an exponential correlation was observed in which the average thickness of the FeAl alloy layer formed in the heat shock region increases steeply with increasing Al content up to an Al content of the coating in the normal region of about 10.0% by mass and the average thickness of the FeAl alloy layer increases asymptotically at an Al content of 10.0% or more by mass. As compared with GA (for example, 0.13% Al bath) and GI (for example, 0.19% Al bath), which are typical Zn coated steel sheets, slightly increasing the Al content of the coating of the high-strength zinc-based coated steel sheet used in accordance with aspects of the present invention markedly changes the formation of the FeAl alloy layer by heat input during welding; thus, the effect of the FeAl alloy layer on the suppression of the penetration of Zn into the base steel sheet, i.e., LME resistance properties, should be improved. In the formula described in FIG. 3, y-axis is the average thickness (μm) of the FeAl alloy layer, and X-axis is the Al content (% by mass) of the coating in the normal region.

Average Thickness of Zinc-Based Coated Layer 4 on FeAl Alloy Layer 3: 2.0 μm or More The inventors evaluated the corrosion resistance of the weld 2 around the sheet separation of welded members produced under various conditions in the same manner as the above-described cracking behavior. The evaluation results indicated that a zinc-based coated layer having an average thickness of 2.0 μm or more was formed on the FeAl alloy layer 3 in each welded member having good corrosion resistance around the sheet separation. It is considered that the corrosion resistance of the weld was improved by sacrificial corrosion protection offered by Zn. Accordingly, the zinc-based coated layer 4 on the FeAl alloy layer 3 in the heat shock region has an average thickness of 2.0 μm or more. The zinc-based coated layer 4 preferably has an average thickness of 2.5 μm or more. The zinc-based coated layer 4 more preferably has an average thickness of 3.0 μm or more.

The upper limit of the zinc-based coated layer 4 on the FeAl alloy layer 3 in the heat shock region is not particularly specified and is preferably 9.5 μm or less.

In accordance with aspects of the present invention, the zinc-based coated layer can be subjected to measurements by methods described in Examples.

Average Thickness of FeAl Alloy Layer after Welding (Preferred Condition)

In the welded member according to aspects of the present invention, the average thickness of the FeAl alloy layer 3 in the heat shock region can satisfy the relationship represented by formula (1):

$$[\text{Average thickness of FeAl alloy layer}] \geq 0.8 \times \ln[\text{Al content}] + 0.2 \quad (1)$$

where ln is a natural logarithm.

Increasing the Al content of the coating 1b before welding so as to satisfy formula (1) makes it possible to adjust the thickness of the FeAl alloy layer 3 in such a manner that the effect of inhibiting the penetration of Zn into the base steel sheet can be more effectively suppressed. This can further suppress cracking at the spot weld, in other words, further improve the LME resistance properties.

Zn-Rich Phase (η) with Fe Content of 5% or Less by Mass (Preferred Condition)

The above-described evaluation results also indicated that in each welded member having particularly good corrosion resistance, a Zn-rich phase (η) having an Fe content of 5% or less by mass was present around the sheet separation in the outer portion of the weld 2 in addition to the coating structure in the heat shock region. The "outer portion of the weld 2" used here refers to a portion of the heat shock region. The Zn-rich phase (η) is a Zn coating vaporized or melted by a temperature increase during spot welding from the inside of the nugget 2a or corona bond area 2b. Although not illustrated, the Zn-rich phase (η) is formed on the zinc-based coated layer 4.

During spot welding, usually, the high-strength zinc-based coated steel sheet 1 reacts with the coating 1b (Zn coating) of the steel sheet 1, thus increasing the Fe content of the coating. In the welded member having good corrosion resistance, however, the Zn coating (Zn-rich phase) in the heat shock region had an Fe content of 5% or less by mass. This is presumably due to the fact that the alloying reaction was inhibited by the high-melting-point FeAl alloy layer 3 formed at the interface between the coating and the steel sheet and the Fe content is relatively reduced because of the high purity of zinc of the Zn coating ejected. Accordingly, the Fe content of the Zn-rich phase present around the sheet separation in the outer portion of the weld 2 in the heat shock region is 5% or less by mass.

The lower limit of the Fe content of the Zn-rich phase is not particularly specified and is preferably 0.5% or more by mass.

In accordance with aspects of the present invention, the Fe content of the Zn-rich phase can be measured by a method described in Examples below.

(001) Orientation of Zn-Rich Phase (η) with Respect to Basal Surface (Preferred Condition)

The above-described evaluation results also indicated that in each welded member having particularly good corrosion resistance, the Zn-rich phase (η) tended to have (001) orientation. Although the mechanism by which the corrosion resistance is improved by the orientation ratio of Zn ejected is not clear, the (001) plane was parallel to the base, and thus barrier properties were seemingly provided in addition to sacrificial corrosion protection offered by Zn.

In the case where the η phase is grown in random directions and has no orientation, the orientation ratio of Zn is 0.1. The orientation ratio increases as the orientation ratio becomes larger than 0.1.

In accordance with aspects of the present invention, the orientation ratio of the (001) plane of the Zn-rich phase (η) can be measured by a method described in Example below. In accordance with aspects of the present invention, when the value of the orientation ratio measured by the method is 0.15 or more, the Zn-rich phase (η) has the orientation of the (001) plane with respect to the basal surface.

As described above, the spot welded member including the weld 2 having the structure of the coated layer described above has the effects of both suppressing cracking and achieving high corrosion resistance.

The reasons for limiting the components and structure of the high-strength zinc-based coated steel sheet used for the spot welded member according to aspects of the present invention will be described below.

In accordance with aspects of the present invention, as at least one sheet in the sheet stack of multiple steel sheets, a high-strength zinc-based coated steel sheet is used. The high-strength zinc-based coated steel sheet has a component composition containing, by mass percent, C: 0.01% to 0.22%, Si: 0.02% to 2.00%, Mn: 1.0% to 4.0%, P: 0.060% or less, and S: 0.01% or less.

C: 0.01% to 0.22%

C is an element that forms for example, martensite as a steel structure to improve the strength. To obtain desired tensile strength in accordance with aspects of the present invention, the C content needs to be 0.01% or more. A C content of more than 0.22% results in a deterioration in the toughness of the spot weld. Accordingly, the C content is 0.01% to 0.22%. The C content is preferably 0.02% or more and preferably 0.18% or less.

Si: 0.02% to 2.00%

Si is an element effective in strengthening steel to achieve high material quality. To provide this effect, the Si content needs to be 0.02% or more. A Si content of more than 2.00% results in a deterioration in coatability. Accordingly, the Si content is 0.02% to 2.00%. The Si content is preferably 0.3% or more and preferably 1.5% or less.

Mn: 1.0% to 4.0%

Mn is an element effective in increasing the strength of steel. To obtain good mechanical properties and high strength, Mn needs to be contained in an amount of 1.0% or more. A Mn content of more than 4.0% results in the increase of surface concentration during annealing, making it difficult to achieve good coating adhesion. Accordingly, the Mn content is 1.0% to 4.0%. The Mn content is preferably 1.2% or more and preferably 3.0% or less.

P: 0.060% or Less

P is an element effective in strengthening ferrite. The addition of an appropriate amount of P improves the balance between strength and ductility. However, a P content of more than 0.060% results in grain boundary embrittlement due to the segregation of P at austenite grain boundaries during casting to deteriorate the local ductility, thereby decreasing the balance between strength and ductility. Accordingly, the P content is 0.060% or less, preferably 0.005% to 0.020% or less.

S: 0.01% or Less

S forms inclusions, such as MnS, to cause a deterioration in impact resistance and cracking along metal flow in a weld. Accordingly, the S content is desirably minimized and thus is 0.01% or less. To achieve good stretch-flangeability, the S content is preferably 0.005% or less.

The remainder other than the above-mentioned components (basic components) may be Fe and incidental impurities.

In accordance with aspects of the present invention, in addition to the above-mentioned basic components, the following components can be appropriately contained as needed with the intention of further improving the properties of the steel sheet.

One or Two or More Selected from Nb: 0.002% to 0.100%, Ti: 0.002% to 0.100%, and B: 0.0002% to 0.0050%

Each of Nb and Ti is an element that can effectively contribute to the precipitation strengthening of steel when contained in an amount of 0.002% or more. However, when each of the Nb content and the Ti content is more than 0.100%, the shape fixability may decrease. Accordingly, when Nb and Ti are contained as needed, each of the Nb content and the Ti content is 0.002% to 0.100%, preferably 0.010% or more and 0.080% or less.

B has the effect of suppressing the formation and growth of ferrite from the austenite grain boundary. For this reason, B is preferably contained in an amount of 0.0002% or more. An excessively high B content results in a marked deterioration in formability. Accordingly, when B is contained as needed, the B content is 0.0002% to 0.0050%, preferably 0.0010% or more and 0.0030% or less.

Regarding the stacked multiple steel sheets in accordance with aspects of the present invention, multiple steel sheets of the same type may be stacked. Alternatively, multiple steel sheets of different types may be stacked. The thickness of the steel sheets may be the same or different. Surface-treated steel sheets including a coated layer may be stacked.

For example, in the case where a sheet stack of two steel sheets and where the two sheets are high-strength zinc-based coated steel sheets as illustrated in FIG. 1, the above-described coating structure in the heat shock region is formed on a surface of the steel sheet on each side of the steel sheet stacking plane, which is not illustrated though. The coatings are melted during welding to form the FeAl alloy layers 3 on the surface of the steel sheet on each side of the steel sheet stacking plane, thereby providing the same effect as the above-described effect.

For example, in the case of using a sheet stack of two steel sheets, i.e., a zinc-based coated steel sheet and a non-zinc-based coated steel sheet (cold-rolled steel sheet), the above-described effect is also provided. Specifically, on the surface of not only an ultrahigh-tensile-strength steel sheet (cold-rolled steel sheet) including an Al-containing Zn coating but also any high-tensile-strength steel sheet in contact with the steel sheet at the steel sheet stacking plane in the weld 2, the coating is melted during welding to form the FeAl alloy layers 3 on the surface of the steel sheet on each side of the steel sheet stacking plane, thereby providing the same effect as the above-described effect.

For example, also in the case of using a sheet stack of three steel sheets, the above-described effect is provided similarly. In the case where, as an example, a zinc-based coated steel sheet, a cold-rolled steel sheet, and a zinc-based coated steel sheet are stacked in this order and spot-welded to form a weld, or even in the case where, as another example, a cold-rolled steel sheet, a cold-rolled steel sheet, and a zinc-based coated steel sheet are stacked in this order and spot-welded to form a weld, the coating structure in the heat shock region is formed on a surface of each of the cold-rolled steel sheet and the zinc-based coated steel sheet on both sides of the steel sheet stacking plane between the steel sheets. The FeAl alloy layers 3 are formed on the surfaces of the steel sheets, thereby providing the same effect as the above-described effect.

An example of a method for producing a welded member including the weld 2 having the above-described coating structure according to a preferred embodiment of the present invention will be described below. The welding conditions in this production method are not limited to this example.

In accordance with aspects of the present invention, a sheet stack of a total of two or more steel sheets including one or more high-strength zinc-based coated steel sheets is joined by resistance spot welding. Here, a resistance spot welding method in which a sheet stack of two steel sheets is pressed by a pair of electrodes, energized under predetermined welding conditions, and joined to form the weld 2 illustrated in FIG. 2 will be described below.

First, the steel sheet 1 to be disposed on the lower side and the steel sheet 1 to be disposed on the upper side are stacked. Here, the steel sheet disposed on the lower side is the high-strength zinc-based coated steel sheet described above.

Then the sheet stack is held between an electrode arranged on the lower side and an electrode arranged on the upper side. The energization is performed with the sheet stack pressed while control is performed in such a manner that preferred welding conditions described below are satisfied. Thereby, the weld 2 having the coating structure can be formed around the sheet separation on the steel sheet stacking plane.

<Welding Conditions>

Inclination Angle of Electrode: More than 0° and 10° or Less

In the case of an inclination angle of 0°, the above-described problem of the present invention does not arise. Thus, the inclination angle is more than 0°. From the viewpoint of preventing the displacement of the sheets during welding, the inclination angle is preferably 10° or less.

Electrode Force: 3.0 to 5.0 kN

A welding force of less than 3.0 kN makes it difficult to ensure a sufficient nugget diameter. A welding force of more than 5.0 kN results in a high load on a spot welder. Accordingly, the welding force is 3.0 to 5.0 kN.

Current Supply Pattern

While the effects according to aspects of the present invention are usually provided in volume production using a single-stage current pattern, the current supply pattern is not particularly limited thereto. For example, also in the case where two-stage current supply pattern or pulsed current supply pattern is used in order to control the weld nugget structure and secure the strength, the effects according to aspects of the present invention can be provided.

EXAMPLES

While the effects and advantages according to aspects of the present invention will be described below by examples, the present invention is not limited to these examples described below. It will be understood that modifications may be made to the configuration without departing from the spirit and scope of the present invention.

Slabs having steel compositions given in Table 1 were each heated in a heating furnace at 1,250° C. for 60 minutes, hot-rolled to 2.8 mm, and coiled at 530° C. The steel sheets were then pickled to remove mill scale and cold-rolled to 1.2 mm. Some of the cold-rolled steel sheets were used as they were. The other cold-rolled steel sheets were subjected to heat treatment with an ART-type CGL. The resulting steel sheets were subjected to coating treatment in Zn baths under conditions (type of coating and Al content) given in Table 2 to produce high-strength hot-dip galvanized steel sheets.

The high-strength hot-dip galvanized steel sheets and the cold-rolled steel sheets thus obtained were used to form sheet stacks in which multiple steel sheets given in Table 2 were stacked. At least one of the multiple steel sheets was the high-strength hot-dip galvanized steel sheet. Each sheet stack was held and subjected to resistance spot welding under the following welding conditions with a resistance welder including a direct-current power supply and a servomotor attached to a C-type gun, the servomotor being used for pressing. Thereby, a welded member including the weld 2 illustrated in FIG. 2 was produced.

<Welding Conditions>

Regarding the welding conditions, the inclination angle of the electrodes is 7°, and the electrode force is 3.5 kN. The welding current pattern is controlled in such a manner that the nugget diameter to be obtained ranges from $3.5\sqrt{t}$ to $5.5\sqrt{t}$, where t (mm) is the thickness of the steel sheet. As the pair of electrodes (lower electrode and upper electrode) for holding the steel sheets, Cu—Cr alloy electrodes having an electrode shape of DR6 (JIS DR6Øtype) were used.

The resulting welded members were each used to evaluate the structure of the coated layer 5 in the outer portion of the spot weld 2 and various characteristics by methods described in (1) to (4) below.

(1) Structure of Coated Layer 5 in Heat Shock Region

Regarding the structure of the coated layer 5, the thickness of the FeAl alloy layer 3 and the thickness of the zinc-based coated layer 4 on the FeAl alloy layer 3 in the heat shock region were measured by the observation of the cross section of the weld 2 with a scanning electron microscope (SEM). Specifically, the weld 2 of the welded member was cut in the thickness direction. The resulting section was mirror-polished, and the heat shock region was observed with the SEM (magnification: ×5,000). The thickness (μm) of the FeAl alloy layer 3 and the thickness (μm) of the zinc-based coated layer 4 thereon were measured at 10 points spaced at 10-μm intervals from the edge A of the corona bond area in the longitudinal direction of the steel sheet (direction away from the nugget 2a), and the average values were calculated. The average values were used as the thickness of the FeAl alloy layer 3 and the thickness of the zinc-based coated layer 4. In Table 2, the zinc-based coated layer 4 is expressed as a Zn coated layer.

(2) Structure of Ejected Zn (Zn-Rich Phase (η)) Around Sheet Separation in Weld

The welded member was disassembled by cutting the heat shock region with a micro-cutter. The Fe content of Zn (Zn-rich phase (η)) ejected between the steel sheets was measured at 10 points by EPMA analysis. The average value was calculated and used as the Fe content (% by mass).

Regarding the orientation of the Zn-rich phase, (η), the orientation ratio of the Zn(001) plane was calculated from a diffraction pattern obtained by X-ray microdiffraction measurement (RINT-RAPIDII-R, available from Rigaku Corporation, X-ray source: Co-Kα, voltage: 45 kV, current: 160 mA) at a mask diameter of 100 μm, and the ten-point average value was calculated. When the average value was 0.15 or more, the Zn-rich phase (η) was determined to have (001) orientation with respect to the basal surface.

(3) LME Crack Evaluation

LME crack evaluation was performed as follows: The weld 2 of the welded member was cut in the thickness direction. The resulting section was mirror-polished. The cross-sectional structure of the nugget 2a was observed with an optical microscope at a magnification of ×100. Here, the LME crack evaluation was performed at N=10 according to the following criteria. In this example, the cases of symbols ⊙, ○, and ● were rated good, and the cases of symbols Δ and x were rated poor. The symbols ●, ○, and ⊙ indicate that better ratings are given in that order.

⊙: No cracking occurred in any member.

○: Cracking occurred in two or less members, and the cracks had an average depth of less than 100 μm.

●: Cracking occurred in two or less members, and the cracks had an average depth of 100 μm or more and less than 300 μm.

Δ: Cracking occurred in two or less members, and the cracks had an average depth of 300 μm or more.

x: Cracking occurred in three or more members.

(4) Corrosion Resistance Evaluation

Corrosion resistance evaluation was performed as follows: The welded members were subjected to a corrosion test (SAE-J2334). The corrosion resistance of the weld 2 was evaluated by measuring the pit depth and the area percentage of red rust in a circumferential region extending from the edge A of the corona bond area to a position 10 mm from the edge A toward the outer periphery. The pit depth was measured in freely-selected 100 locations with a micrometer, and the average value was used as the average pit depth. An external photograph of the region was used to mark the area where red rust had been formed, and the area percentage of red rust was calculated by image binarization. Here, the corrosion resistance was evaluated at N=10 according to the following criteria. In this example, the cases of symbols ⊙, ○, and ● were rated good, and the cases of symbols Δ and x were rated poor. The symbols ●, ○, and ⊙ indicate that better ratings are given in that order.
- ⊙: At 90 cycles, the average pit depth was 300 μm or less, and the area percentage of red rust was less than 5%.
- ○: At 90 cycles, the average pit depth was 300 μm or less, and the area percentage of red rust was 5% or more and less than 20%
- ●: At 90 cycles, the average pit depth was 300 μm or less, and the area percentage of red rust was 20% or more and less than 50%
- Δ: At 90 cycles, the average pit depth was 300 μm or less, and the area percentage of red rust was 50% or more.
- x: At 90 cycles, the average pit depth was more than 300 μm.

The results are also presented in Table 2. According to Table 2, all of the spot welded members within the scope according to aspects of the present invention have desired LME resistance and corrosion resistance.

TABLE 1

| Type of steel | TS (MPa) | C | Si | Mn | P | S | Nb | Ti | B (% by mass) |
|---|---|---|---|---|---|---|---|---|---|
| A | 796 | 0.09 | 1.00 | 2.1 | 0.010 | 0.005 | — | — | — |
| B | 981 | 0.06 | 0.25 | 2.7 | 0.010 | 0.005 | — | — | — |
| C | 1231 | 0.12 | 0.42 | 3.0 | 0.030 | 0.005 | — | — | — |
| D | 1485 | 0.10 | 1.50 | 3.2 | 0.050 | 0.005 | 0.010 | — | — |
| E | 785 | 0.13 | 0.90 | 1.9 | 0.020 | 0.005 | — | 0.020 | — |
| F | 1016 | 0.02 | 1.80 | 2.8 | 0.020 | 0.005 | — | — | 0.0015 |
| G | 1199 | 0.16 | 0.30 | 2.7 | 0.010 | 0.005 | 0.025 | 0.040 | — |
| H | 1477 | 0.08 | 1.10 | 3.2 | 0.010 | 0.005 | 0.030 | 0.020 | 0.0020 |
| I | 829 | 0.25 | 1.00 | 1.3 | 0.100 | 0.025 | 0.030 | 0.020 | 0.0020 |
| J | 1023 | 0.40 | 2.20 | 0.5 | 0.010 | 0.005 | 0.080 | 0.040 | 0.0020 |
| K | 1217 | 0.30 | 0.80 | 1.8 | 0.100 | 0.025 | 0.020 | 0.020 | 0.0020 |
| L | 1560 | 0.02 | 0.10 | 4.5 | 0.100 | 0.005 | 0.020 | 0.040 | 0.0020 |

The balance is Fe and incidental impurities.

TABLE 2

| No. | Welded sheet stack - Steel sheet ① Type of steel | Steel sheet ① Type of coating | Steel sheet ① Al content (% by mass) | Steel sheet ② Type of steel | Steel sheet ② Type of coating | Steel sheet ② Al content (% by mass) | Sheet stack | | Coating phase (steel sheet ①) Heat shock region FeAl alloy layer (μm) | Coating phase (steel sheet ①) Heat shock region Zn coated layer (μm) | Coating phase (steel sheet ①) Zn-rich phase Fe content (% by mass) | Coating phase (steel sheet ①) Zn-rich phase Orientation ratio | Evaluation result LME crack (*1) | Evaluation result Corrosion resistance (*2) | Remarks |
|---|---|---|---|---|---|---|---|---|---|---|---|---|---|---|---|
| 1 | A | ZnAl | 1.5 | A | ZnAl | 1.5 | coated/coated | same type | 0.9 | 3.5 | 4.0 | 0.19 | ○ | ⊙ | Example |
| 2 | A | ZnAl | 5.0 | A | ZnAl | 5.0 | coated/coated | same type | 2.3 | 5.2 | 3.2 | 0.28 | ⊙ | ⊙ | Example |
| 3 | A | ZnAlMg | 5.0 | A | ZnAlMg | 5.0 | coated/coated | same type | 2.9 | 7.0 | 1.5 | 0.42 | ⊙ | ○ | Example |
| 4 | A | ZnAl | 3.0 | A | — | — | coated/cold rolled | same type | 1.1 | 2.3 | 8.3 | 0.17 | ○ | ○ | Example |
| 5 | A | ZnAlMg | 2.5 | B | ZnAlMg | 2.5 | coated/coated | different type | 2.1 | 2.8 | 9.2 | 0.09 | ⊙ | ● | Example |
| 6 | A | ZnAl | 0.2 | A | ZnAl | 0.2 | coated/coated | same type | 0.1 | 4.2 | 10.5 | 0.10 | X | △ | Comparative example |
| 7 | B | ZnAl | 5.0 | B | — | — | coated/cold rolled | same type | 2.0 | 4.1 | 2.6 | 0.25 | ⊙ | ⊙ | Example |
| 8 | B | ZnAl | 12.0 | B | ZnAl | 12.0 | coated/coated | same type | 4.1 | 8.3 | 0.9 | 0.34 | ⊙ | ○ | Example |
| 9 | B | ZnAl | 7.0 | B | ZnAl | 7.0 | coated/coated | same type | 2.7 | 3.6 | 1.7 | 0.29 | ⊙ | ○ | Example |
| 10 | B | ZnAlMg | 3.5 | D | — | — | coated/cold rolled | different type | 2.1 | 3.1 | 4.1 | 0.05 | ⊙ | ● | Example |
| 11 | B | ZnAlMg | 0.1 | A | GA | 0.1 | coated/coated | different type | 0.2 | 7.2 | 7.6 | 0.12 | △ | ○ | Comparative example |
| 12 | C | ZnAl | 3.0 | C | ZnAl | 3.0 | coated/coated | same type | 1.9 | 5.2 | 3.2 | 0.17 | ○ | ⊙ | Example |
| 13 | C | ZnAl | 3.0 | C | ZnAl | 3.0 | coated/coated | same type | 1.3 | 6.7 | 2.4 | 0.21 | ⊙ | ⊙ | Example |
| 14 | C | ZnAlMg | 0.5 | C | ZnAlMg | 0.5 | coated/coated | same type | 0.4 | 4.3 | 4.8 | 0.18 | ● | ● | Example |
| 15 | C | ZnAl | 6.0 | A | ZnAl | 6.0 | coated/coated | different type | 3.8 | 2.1 | 5.5 | 0.04 | ○ | ○ | Example |
| 16 | C | ZnAl | 0.2 | C | — | — | coated/cold rolled | same type | 0.1 | 10.0 | 15.3 | 0.13 | X | ○ | Comparative example |
| 17 | D | ZnAl | 55.0 | D | ZnAl | 3.0 | coated/coated | same type | 4.8 | 3.2 | 1.2 | 0.28 | ⊙ | ⊙ | Example |
| 18 | D | ZnAlMgSi | 9.5 | D | ZnAlMgSi | 9.5 | coated/coated | same type | 3.2 | 5.5 | 1.1 | 0.44 | ⊙ | ○ | Example |
| 19 | D | ZnAl | 2.0 | B | ZnAl | 2.0 | coated/coated | different type | 1.7 | 4.0 | 3.5 | 0.07 | ○ | ○ | Example |
| 20 | D | ZnAl | 1.5 | D | ZnAl | 1.5 | coated/coated | same type | 0.5 | 1.5 | 8.2 | 0.08 | △ | △ | Comparative example |
| 21 | D | ZnAlMg | 0.3 | D | ZnAlMg | 0.3 | coated/coated | same type | 0.2 | 6.2 | 15.3 | 0.12 | △ | X | Comparative example |
| 22 | E | ZnAl | 2.0 | E | ZnAl | 2.0 | coated/coated | same type | 0.9 | 4.6 | 2.7 | 0.31 | ● | ○ | Example |
| 23 | E | ZnAlMg | 1.5 | E | ZnAlMg | 1.5 | coated/coated | same type | 1.6 | 3.6 | 2.3 | 0.12 | ○ | ○ | Example |
| 24 | F | ZnAl | 6.0 | F | ZnAl | 6.0 | coated/coated | same type | 3.2 | 7.3 | 0.8 | 0.38 | ⊙ | ○ | Example |
| 25 | F | ZnAl | 4.5 | A | ZnAl | 4.5 | coated/cold rolled | different type | 3.2 | 2.5 | 3.1 | 0.08 | ○ | ○ | Example |
| 26 | G | ZnAlMg | 3.0 | G | ZnAlMg | 3.0 | coated/coated | same type | 1.8 | 9.1 | 1.8 | 0.36 | ⊙ | ○ | Example |
| 27 | G | ZnAl | 2.5 | G | ZnAl | 2.5 | coated/coated | same type | 2.5 | 3.8 | 6.7 | 0.11 | ⊙ | ● | Example |
| 28 | H | ZnAlMg | 25.0 | H | ZnAlMg | 25.0 | coated/coated | same type | 4.1 | 4.4 | 0.6 | 0.48 | ⊙ | ⊙ | Example |

TABLE 2-continued

| | Welded sheet stack | | | | | | | Coating phase (steel sheet ①) | | | | | Evaluation result | | |
|---|---|---|---|---|---|---|---|---|---|---|---|---|---|---|---|
| | Steel sheet ① | | Steel sheet ② | | | | | Heat shock region | | Zn-rich phase | | | | | |
| No. | Type of steel | Type of coating | Al content (% by mass) | Type of steel | Type of coating | Al content (% by mass) | Sheet stack | FeAl alloy layer (μm) | Zn coated layer (μm) | Fe content (% by mass) | Orientation ratio | LME crack (*1) | Corrosion resistance (*2) | Remarks |
| 29 | H | ZnAl | 4.0 | H | | | coated/cold rolled | same type | 3.8 | 2.6 | 8.9 | 0.17 | ⊙ | ○ | Example |
| 30 | I | ZnAl | 0.2 | I | ZnAl | 0.2 | coated/coated | same type | 0.1 | 9.3 | 8.1 | 0.06 | △ | △ | Comparative example |
| 31 | I | ZnAlMg | 0.2 | I | ZnAlMg | 0.2 | coated/coated | same type | 0.2 | 11.2 | 6.2 | 0.12 | △ | ○ | Comparative example |
| 32 | J | ZnAl | 0.1 | A | GA | 0.1 | coated/coated | different type | 0.1 | 5.6 | 12.3 | 0.08 | X | X | Comparative example |
| 33 | J | ZnAlMg | 0.2 | J | ZnAlMg | 0.2 | coated/coated | same type | 0.2 | 8.3 | 11.0 | 0.12 | X | △ | Comparative example |
| 34 | K | ZnAl | 0.2 | K | ZnAl | 0.2 | coated/coated | same type | 0.1 | 6.2 | 14.1 | 0.07 | X | X | Comparative example |
| 35 | K | ZnAlMg | 0.2 | K | ZnAlMg | 0.2 | coated/coated | same type | 0.1 | 3.6 | 17.2 | 0.08 | △ | X | Comparative example |
| 36 | L | ZnAl | 0.4 | A | ZnAl | 0.1 | coated/coated | different type | 0.2 | 1.7 | 22.0 | 0.11 | △ | X | Comparative example |
| 37 | L | ZnAlMg | 0.2 | L | ZnAlMg | 0.2 | coated/coated | same type | 0.1 | 3.4 | 15.0 | 0.12 | X | X | Comparative example |

*1,
⊙: No cracking occurred in any member.
○: Cracking occurred in two or less members, and the cracks had an average depth of less than 100 μm.
△: Cracking occurred in two or less members, and the cracks had an average depth of 100 μm or more and less than 300 μm.
●: Cracking occurred in three or more members.
X: Cracking occurred in two or less members, and the cracks had an average depth of 300 μm or more.

*2,
⊙: At 90 cycles, the average pit depth was 300 μm or less, and the area percentage of red rust was less than 5%.
○: At 90 cycles, the average pit depth was 300 μm or less, and the area percentage of red rust was 5% or more and less than 20%.
△: At 90 cycles, the average pit depth was 300 μm or less, and the area percentage of red rust was 20% or more and less than 50%.
●: At 90 cycles, the average pit depth was 300 μm or less, and the area percentage of red rust was 50% or more.
X: At 90 cycles, the average pit depth was more than 300 μm.

REFERENCE SIGNS LIST 1 steel sheet
1a base steel sheet
1b coating
2 weld
2a nugget
2b corona bond
2c weld heat-affected zone
3 FeAl alloy layer
4 zinc-based coated layer
5 coated layer
6 steel sheet stacking plane

The invention claimed is:

1. A spot welded member, comprising a spot weld formed by holding a sheet stack of multiple steel sheets between a pair of electrodes and spot-welding the sheet stack,
wherein the spot welded member comprises a region A and a region B the region B being a heat shock region of the spot weld outwardly extending from an edge of a corona bond area to adjacent region A,
wherein at least one of the multiple steel sheets is a high-strength zinc-based coated steel sheet having a tensile strength of 780 MPa or more, the high-strength zinc-based coated steel sheet having a first zinc-based coating with an Al content of 0.5% or more by mass, in the region A, on a base steel sheet, and
wherein the region B includes a coated layer B including an FeAl alloy layer disposed on a surface of the base steel sheet, and a second zinc-based coated layer, disposed on the FeAL alloy layer,
wherein the FeAL alloy layer has an average thickness of 0.3 μm or more and the second zinc-based coated layer has an average thickness of 2.0 μm or more.

2. The spot welded member according to claim 1, the Al content of the first zinc-based coating satisfies formula (1):

[Average thickness of FeAl alloy layer]≥0.8×ln[Al content]+0.2    (1)

where ln is a natural logarithm, [average thickness of FeAl alloy layer] is the average thickness (μm) of the FeAl alloy layer, and [Al content] is the Al content (% by mass) of the first zinc-based coating.

3. The spot welded member according to claim 1, wherein the coated layer B further includes a Zn-rich phase (n) having an Fe content of 5% or less by mass.

4. The spot welded member according to claim 2, wherein the coated layer B further includes a Zn-rich phase (n) having an Fe content of 5% or less by mass.

5. The spot welded member according to claim 1, wherein the Zn-rich phase (n) has (001) orientation with respect to a basal surface.

6. The spot welded member according to claim 2, wherein the Zn-rich phase (n) has (001) orientation with respect to a basal surface.

7. The spot welded member according to claim 3, wherein the Zn-rich phase (n) has (001) orientation with respect to a basal surface.

8. The spot welded member according to claim 4, wherein the Zn-rich phase (n) has (001) orientation with respect to a basal surface.

9. The spot welded member according to claim 1, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

10. The spot welded member according to claim 2, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

11. The spot welded member according to claim 3, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

12. The spot welded member according to claim 4, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

13. The spot welded member according to claim 7, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

14. The spot welded member according to claim 8, wherein the base steel sheet of the zinc-based coated steel sheet has a component composition containing, by mass %:
C: 0.01% to 0.22%,
Si: 0.02% to 2.00%,
Mn: 1.0% to 4.0%,
P: 0.060% or less, and
S: 0.01% or less.

15. The spot welded member according to claim 9, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

16. The spot welded member according to claim 10, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

17. The spot welded member according to claim 11, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

18. The spot welded member according to claim 12, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

19. The spot welded member according to claim 13, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

20. The spot welded member according to claim 14, wherein the component composition of the base steel sheet of the zinc-based coated steel sheet further contains, by mass %, one or two or more selected from the group consisting of:
Nb: 0.002% to 0.100%,
Ti: 0.002% to 0.100%, and
B: 0.0002% to 0.0050%.

* * * * *

UNITED STATES PATENT AND TRADEMARK OFFICE
CERTIFICATE OF CORRECTION

PATENT NO. : 12,037,665 B2
APPLICATION NO. : 17/414111
DATED : July 16, 2024
INVENTOR(S) : Minoru Tanaka et al.

Page 1 of 1

It is certified that error appears in the above-identified patent and that said Letters Patent is hereby corrected as shown below:

In the Claims

In Column 19, Line 23 of Claim 1: delete "B the" and insert -- B, the --.

In Column 19, Line 35 of Claim 1: delete "FeAL" and insert -- FeAl --.

In Column 19, Line 35 of Claim 1: delete "laver," and insert -- layer, --.

In Column 19, Line 36 of Claim 1: delete "FeAL" and insert -- FeAl --.

In Column 19, Line 50 of Claim 3: delete "(n)" and insert -- (η) --.

In Column 19, Line 53 of Claim 4: delete "(n)" and insert -- (η) --.

In Column 19, Line 56 of Claim 5: delete "(n)" and insert -- (η) --.

In Column 19, Line 60 of Claim 6: delete "(n)" and insert -- (η) --.

In Column 19, Line 63 of Claim 7: delete "(n)" and insert -- (η) --.

In Column 19, Line 66 of Claim 8: delete "(n)" and insert -- (η) --.

Signed and Sealed this
Twenty-eighth Day of January, 2025

Coke Morgan Stewart
*Acting Director of the United States Patent and Trademark Office*